United States Patent
Blevio, Sr.

(10) Patent No.: US 8,419,368 B1
(45) Date of Patent: Apr. 16, 2013

(54) HIGH-EFFICIENCY TURBINE CONSTRUCTION

(76) Inventor: Henry L. Blevio, Sr., New Milford, CT (US)

(*) Notice: Subject to any disclaimer, the term of this patent is extended or adjusted under 35 U.S.C. 154(b) by 0 days.

(21) Appl. No.: 13/350,743

(22) Filed: Jan. 14, 2012

Related U.S. Application Data (60) Provisional application No. 61/628,164, filed on Oct. 25, 2011.

(51) Int. Cl.
*F03D 1/06* (2006.01)

(52) U.S. Cl.
USPC .......................................... 416/202; 416/228

(58) Field of Classification Search ............ 415/4.2, 415/4.3, 81, 84; 416/178, 185, 202, 228, 416/432, 243; 290/44, 55
See application file for complete search history.

(56) References Cited

U.S. PATENT DOCUMENTS

| | | | | | |
|---|---|---|---|---|---|
| 1,433,995 | A | * | 10/1922 | Fowle | 415/1 |
| 1,961,237 | A | * | 6/1934 | Mobley | 416/185 |
| 2,460,849 | A | * | 2/1949 | Senn | 416/175 |
| 4,184,804 | A | * | 1/1980 | Inagaki et al. | 415/228 |

* cited by examiner

*Primary Examiner* — Edward Look
*Assistant Examiner* — Jason Davis
(74) *Attorney, Agent, or Firm* — K. Gibner Lehmann (57) ABSTRACT

A high-efficiency wind turbine structure for providing torque to a rotary machine such as a generator. The structure embraces a flat central member arranged to rotate on an axis, and a plurality of peripheral vanes arranged so as to exhaust wind to a plurality of constrictions that exist between curved end portions of adjacent vanes. Improved efficiency and simplified construction are considered to be the advantageous characteristics.

9 Claims, 12 Drawing Sheets

FIG. 25

HIGH-EFFICIENCY TURBINE CONSTRUCTION

CROSS-REFERENCES TO RELATED APPLICATIONS

The present application claims priority of my provisional application No. 61/628,164 filed Oct. 25, 2011, entitled HIGH-EFFICIENCY TURBINE CONSTRUCTION, and incorporates by specific reference thereto, all of the disclosure of said provisional application.

The application also claims priority of my co-pending Design patent application Ser. No. 29/395,167, filed Dec. 7, 2011, and entitled, ORNAMENTAL DESIGN FOR A TURBINE ROTOR, and the present application thus incorporates by specific reference thereto, all of the disclosure of said Design Patent application.

BACKGROUND

This invention relates generally to turbine structures, and more particularly to mechanical details of an improved turbine construction adapted to be driven by a fluid medium, such as wind.

Wind turbines currently utilize three symmetrical thin cross-section arms. Contrary to what might be expected, it has been found that by designing these arms so that mostly the tips thereof capture the wind, optimum power is generated. The inner parts of the arms serve solely to transmit the force from the tip-like parts to the hub and driven shaft.

Such devices, while operable for the most part, are not believed by the inventor, to extract the full potential power from the wind, and thus are considered less than maximum efficiency. Furthermore, designing for the conversion of the wind driven shaft to generator speed presents a host of additional problems, which, however, are beyond the scope of the present disclosure.

SUMMARY OF THE INVENTION

The invention is believed to have at least some of the following objects:

To provide a novel and improved turbine rotor or blade construction which is both simple in its structure, and efficient in operation.

To provide an improved turbine rotor or blade construction as above characterized which is reliable over extended periods of use.

To provide an improved turbine rotor or blade construction in accordance with the foregoing, which can be readily fabricated from available materials, such as carbon fiber, aluminum, steel alloy or other metal or metallic alloy.

To provide an improved turbine rotor or blade construction as above set forth, which has substantial energy output and is adaptable for different wind speeds when used as a wind mill component.

To provide an improved turbine rotor or blade construction as above described, which can be especially rugged over extended periods of use.

The invention provides a turbine rotor construction, comprising in combination an expansive member having an axis of rotation, means at the axis, for mounting the member for rotation about said axis, a plurality of individual, thin upstanding vanes mounted rigidly on said expansive member and generally about the periphery of the member, each of said vanes being substantially straight and diverging outwardly from the axis along their respective lengths, at least one end portion of one vane being disposed near an end portion of at least one other adjacent vane, whereby wind impinging upon said expansive member is re-directed outwardly toward all of said vanes, and said vanes in turn re-directing said wind to spaces between said end portion of one vane and the end portion of an adjacent vane to be exhausted through the space between said end portions.

BRIEF DESCRIPTION OF THE DRAWINGS

In the drawings, illustrating several embodiments of the invention.

DESCRIPTION OF THE PREFERRED EMBODIMENTS

Figure 1:
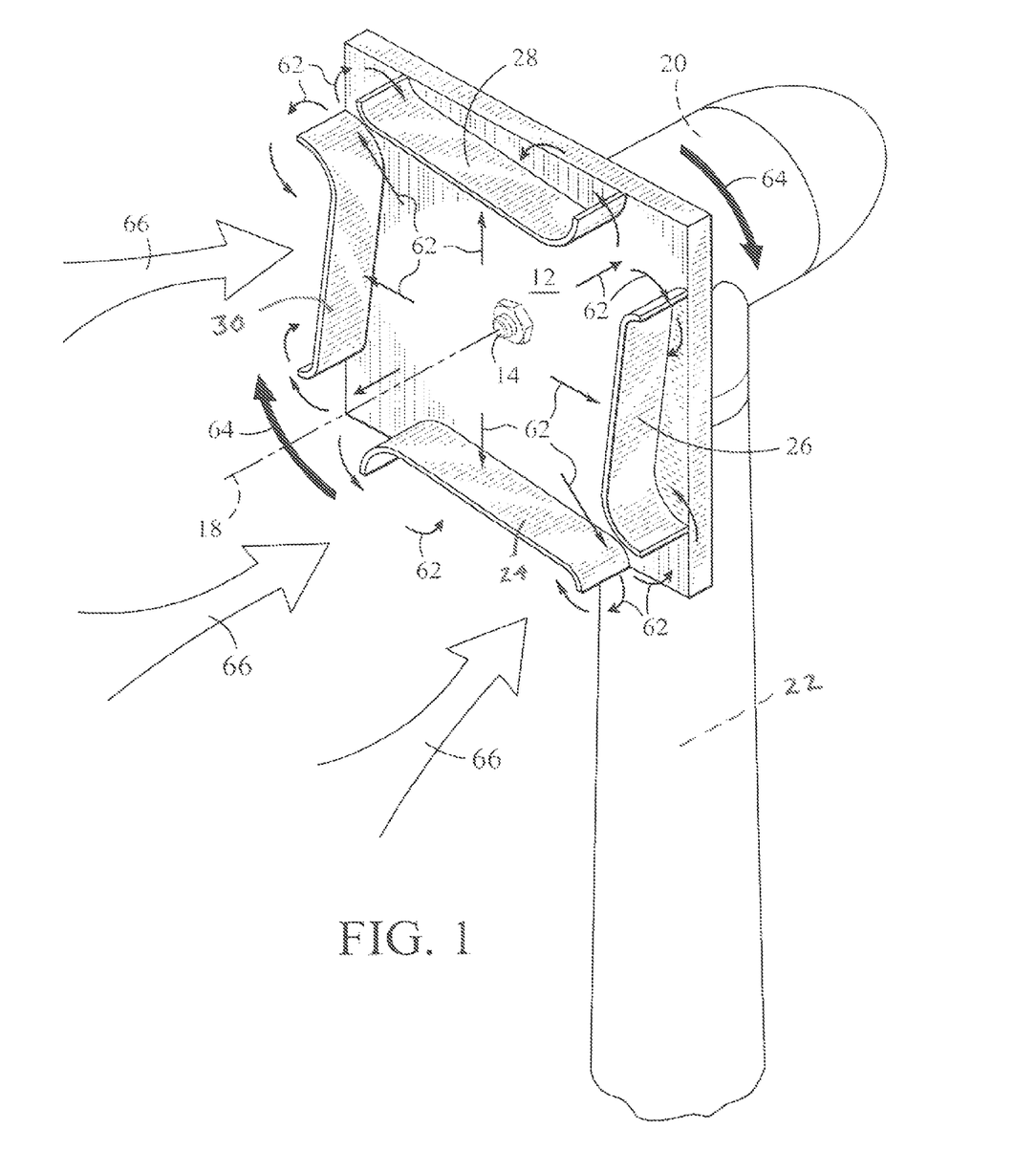
FIG. 1 is a perspective frontal view of the improved turbine rotor structure of the present invention, mounted on a shaft, and with a hub supporting the structure.
Figure 2:
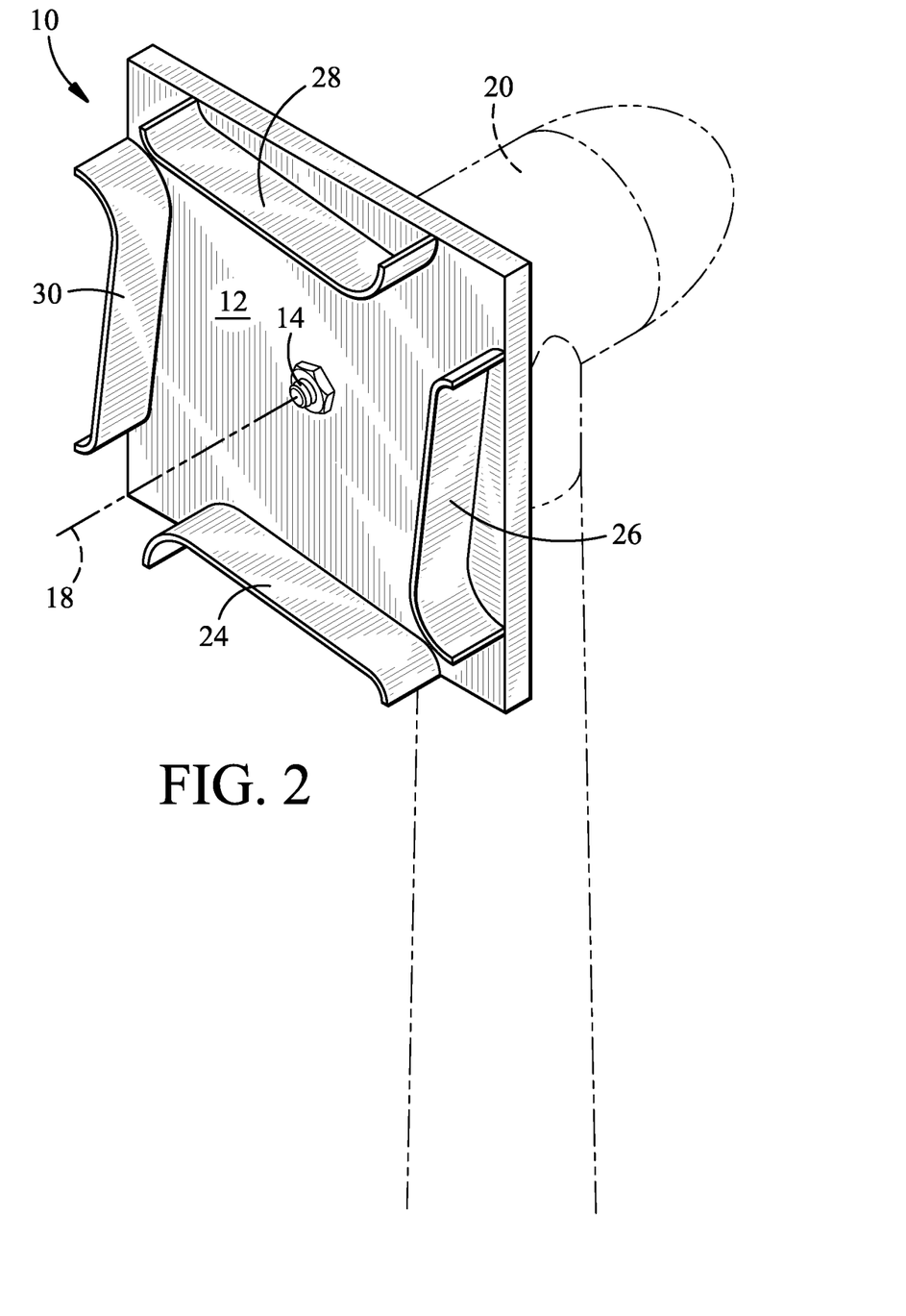
FIG. 2 is a view like FIG. 1, showing a simplified perspective view of the rotor structure of FIG. 1.

Referring first to FIGS. 1 and 2, there is provided a turbine rotor or turbine blade construction generally designated by the numeral 10. It comprises an expansive member 12 mounted on a drive shaft 14 secured by a nut, for rotation along an axis 18. Only the end of this power drive shaft 14 is shown in the figure. The arrangement is such that mechanical forces or torque generated by wind are transmitted to suitable mechanical and electrical conversion equipment indicated by the numeral 20, in the usual manner. The latter are in turn secured in place by a conventional vertical pole or support 22, FIGS. 1 and 2.

The expansive member 12 is arranged to be oriented generally perpendicular to the prevailing wind; the wind thus impinges on the expansive member 12 broadside, in order to effect its turning as will be described below.

Figure 3:
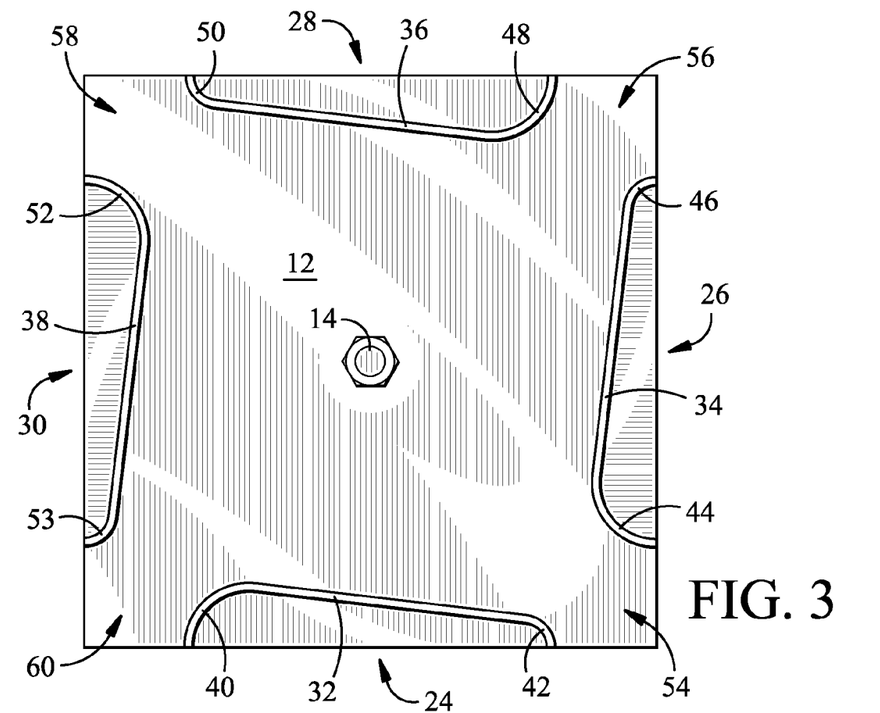
FIG. 3 is a front elevation of the rotor.
Figure 4:
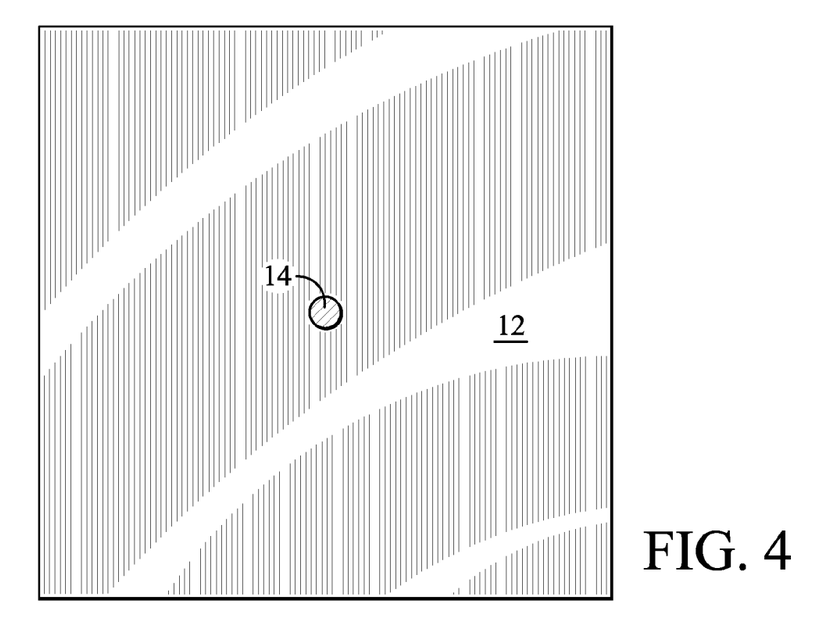
FIG. 4 is a rear elevation of the rotor.
Figure 5:
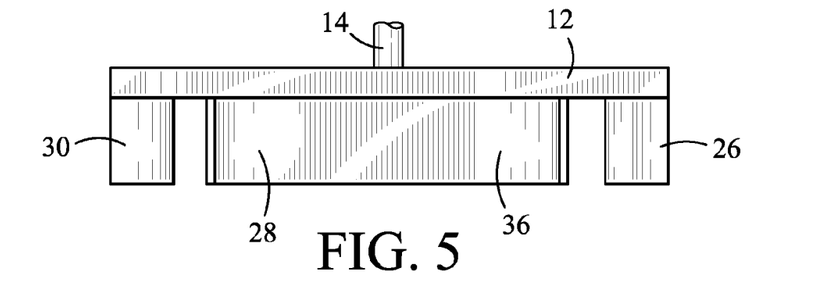
FIG. 5 is a top plan view of the rotor.
Figure 6:
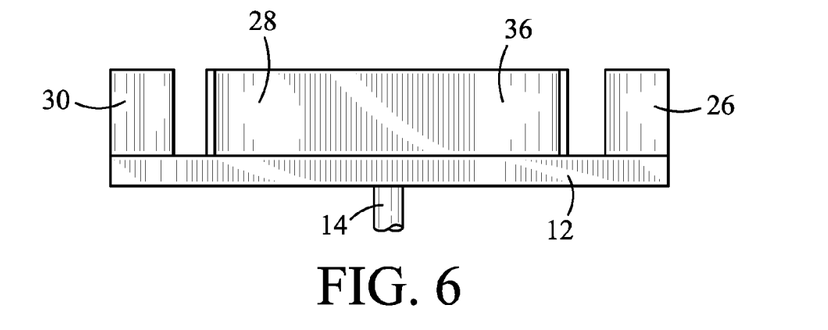
FIG. 6 is a bottom plan view of the rotor.
Figure 7:
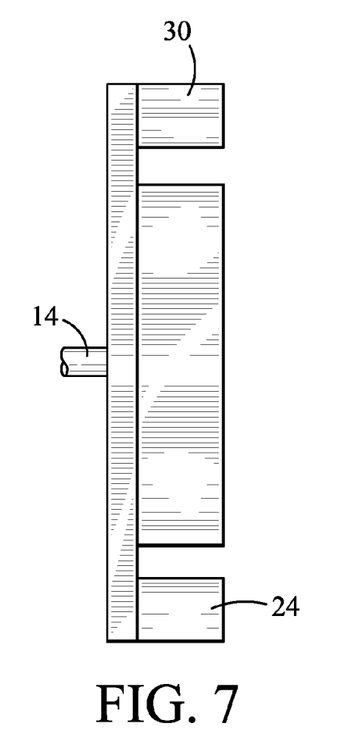
FIG. 7 is a left side elevation of the rotor.
Figure 8:
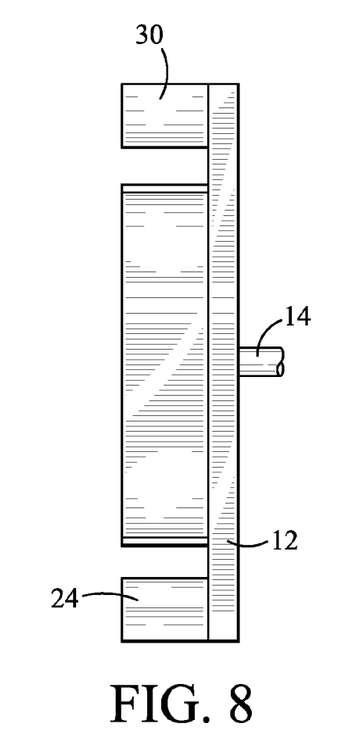
FIG. 8 is a right side elevation of the rotor.

In accordance with the present invention and referring to FIGS. 1, 2 and 3, mounted on the member 12 is a plurality of individual, thin upstanding vanes designated by the numerals 24, 26, 28 and 30, respectively, each vane being generally perpendicular to the surface of the member 12, and further in FIGS. 3-8, each vane having a substantially straight portion 32, 34, 36 and 38, respectively, and at their extremities, curved end portions 40, 42; 44, 46; 48, 50; and 52, 53, respectively. One curved end portion of each vane is immediately adjacent to a curved end portion of the next vane, and the four vanes of the present example taken together, are seen to form a modified parallelogram configuration, FIG. 3. For example, the curved end portion 44 of vane 26 is adjacent to the curved end portion 42 of vane 24, and so on, with respect to the vane pair 26-28, the vane pair 28-30 and the vane pair 30-24.

Further by the invention, the straight portions 32, 34, 36 and 38 of the vanes diverge outwardly along their respective lengths, and the spacings of the ends of the vanes is arranged to define four constrictions 54-60. In operation, the air flow striking the expansive member 12 broadside is first re-directed radially outwardly so as to strike the vanes 24-30 respectively, thereby producing torque on the expansive member in accordance with the well known action/reaction concept of physics. The wind is thereafter channelled to the four constrictions 54-60 between the ends of the vanes, and finally exhausted therethrough. Thus, the thrust generated by the re-directed wind striking the vanes gives rise to the turning movement of the expansive member 12 and its shaft 14, to produce the torque necessary to run equipment involving an electric generator device 20 such as that shown in FIG. 1. The small arrows 62 in FIG. 1 are believed to indicate the direction of the wind in the various areas of the vanes 24-30 and expansive member 12; the larger solid arrows 64 indicate the direction of rotation of the expansive member 12 when it is disposed broadside with respect to the wind, and the wind is considered to be in a direction into the plane of the this member. This movement is designated by the large, hollow-line arrows having the numeral designation 66.

I have discovered that an arrangement of four substantially identical vanes 24-30 carried on a square expansive member 12 as shown in FIG. 1, provides optimum results, as regards the torque produced.

Returning now to the construction of the vanes, the curved end portions 40-53 present convex surfaces defining the constrictions 54-60 noted above. It has been determined that slightly different curvatures at the opposed ends of a given vane, for example, 40 vs. 42, operate to produce maximum torque. These same curved portions 40-53 of the vanes respectively present concave surfaces that face one another in any one vane. This construction is also believed to contribute to the torque realized by the expansive member 12.

The assembly comprising the expansive member and vanes can be constituted of a variety of substances, among which are carbon fiber, aluminum, steel alloy or other metal or metallic alloy. Use of larger weight material for the assembly can be advantageous to the operation of the turbine, because the increased inertia produced by the larger mass tends to equalize slight wind variations that inevitably prevail in varying atmospheric conditions.

Figure 9:
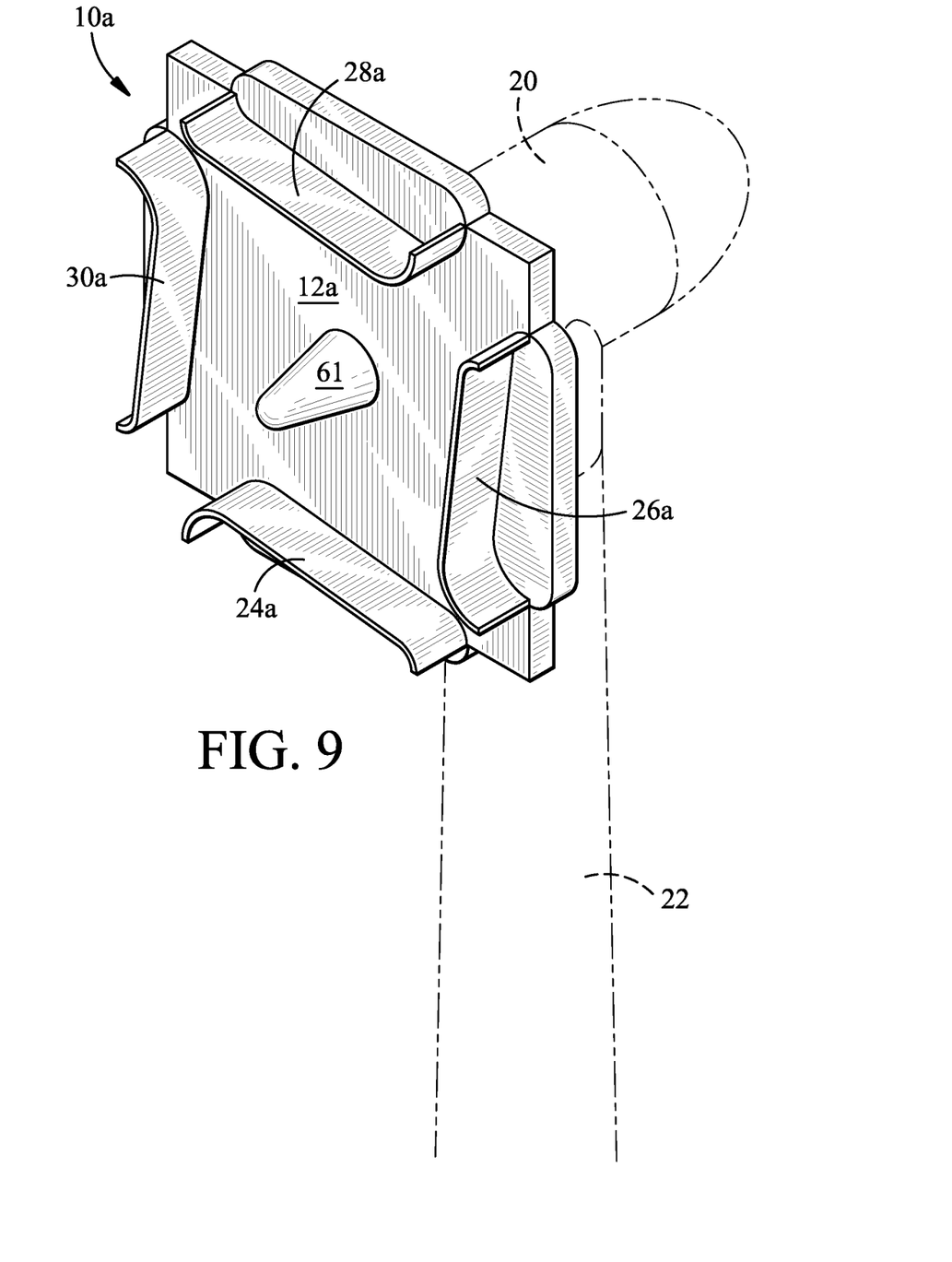
FIG. 9 is a perspective view of a modified turbine rotor, constituting another embodiment of the invention.
Figure 10:
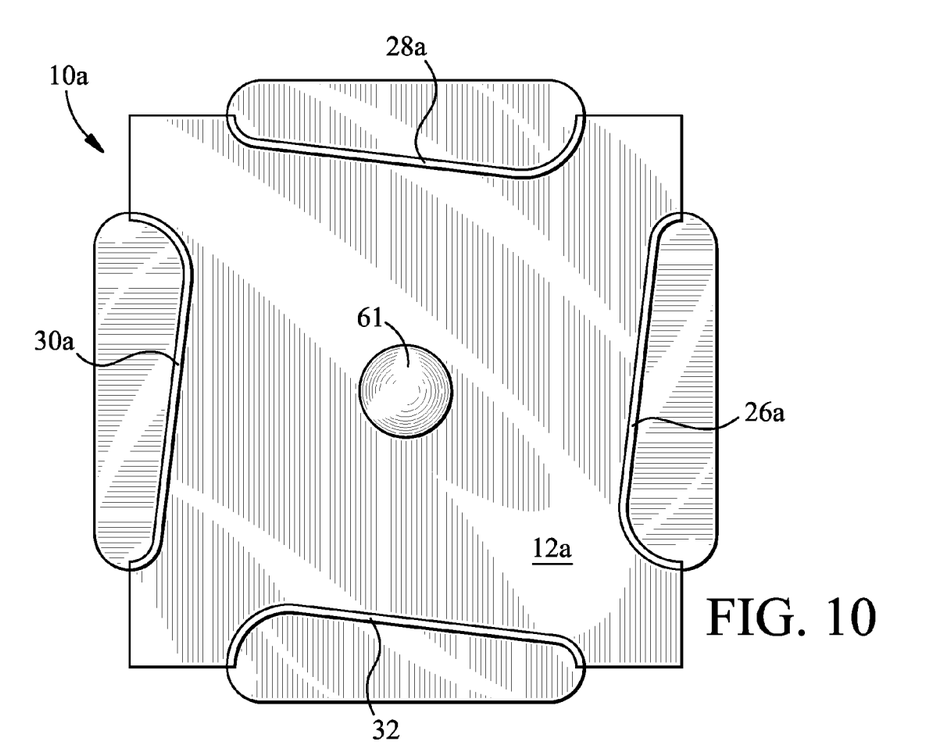
FIG. 10 is a front elevation of the rotor of FIG. 9.
Figure 11:
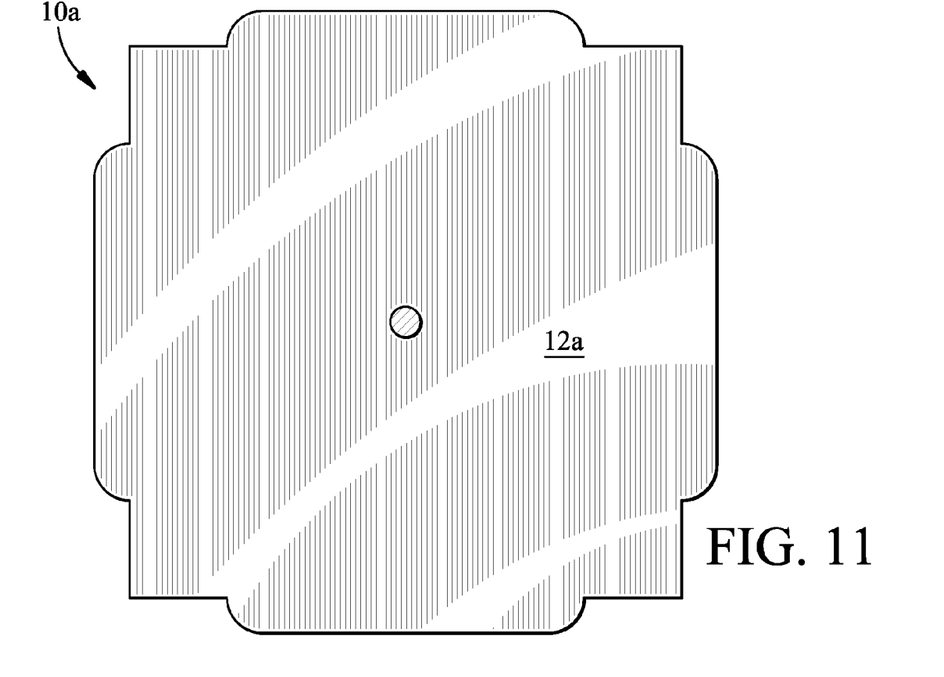
FIG. 11 is a rear elevation of the rotor of FIG. 9.
Figure 12:
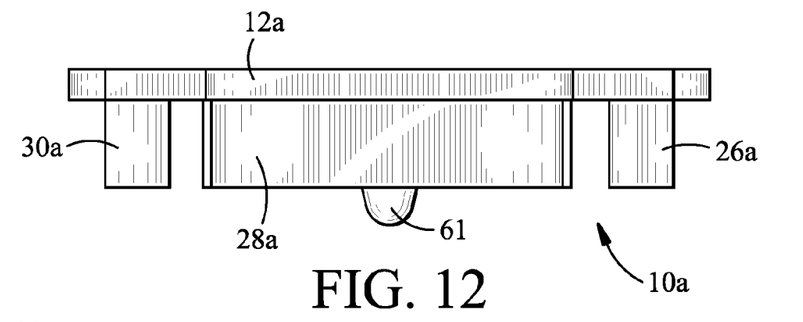
FIG. 12 is a top plan view of the rotor of FIG. 9.
Figure 13:
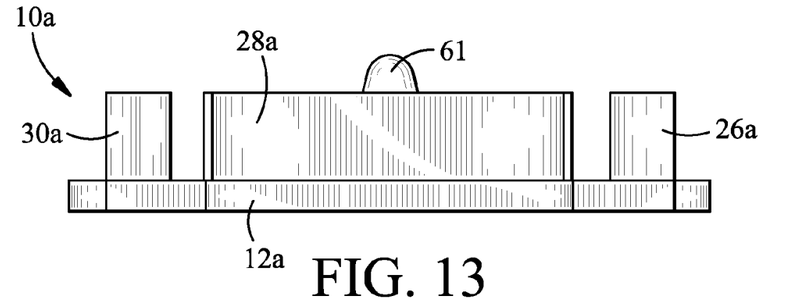
FIG. 13 is a bottom plan view of the rotor of FIG. 9.
Figure 14:
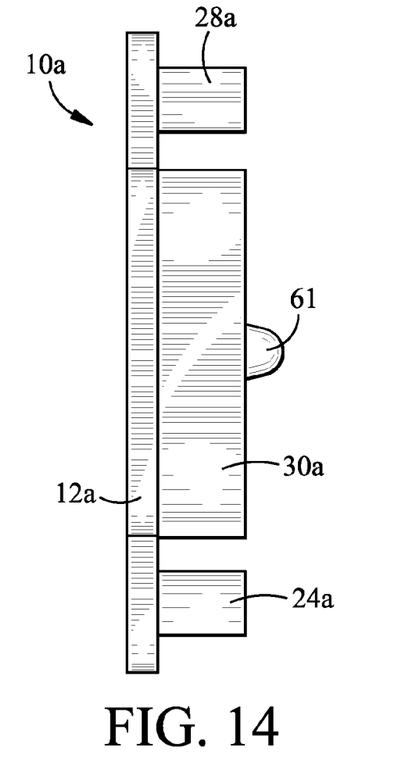
FIG. 14 is a left side elevation of the rotor of FIG. 9.
Figure 15:
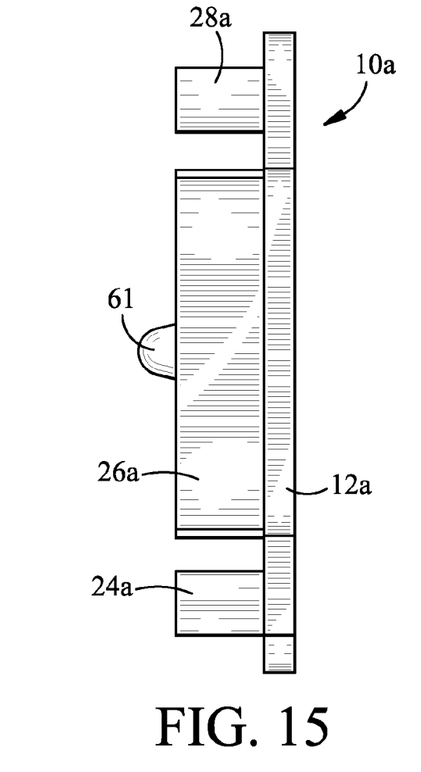
FIG. 15 is a right side elevation of the rotor of FIG. 9.
Figure 16:
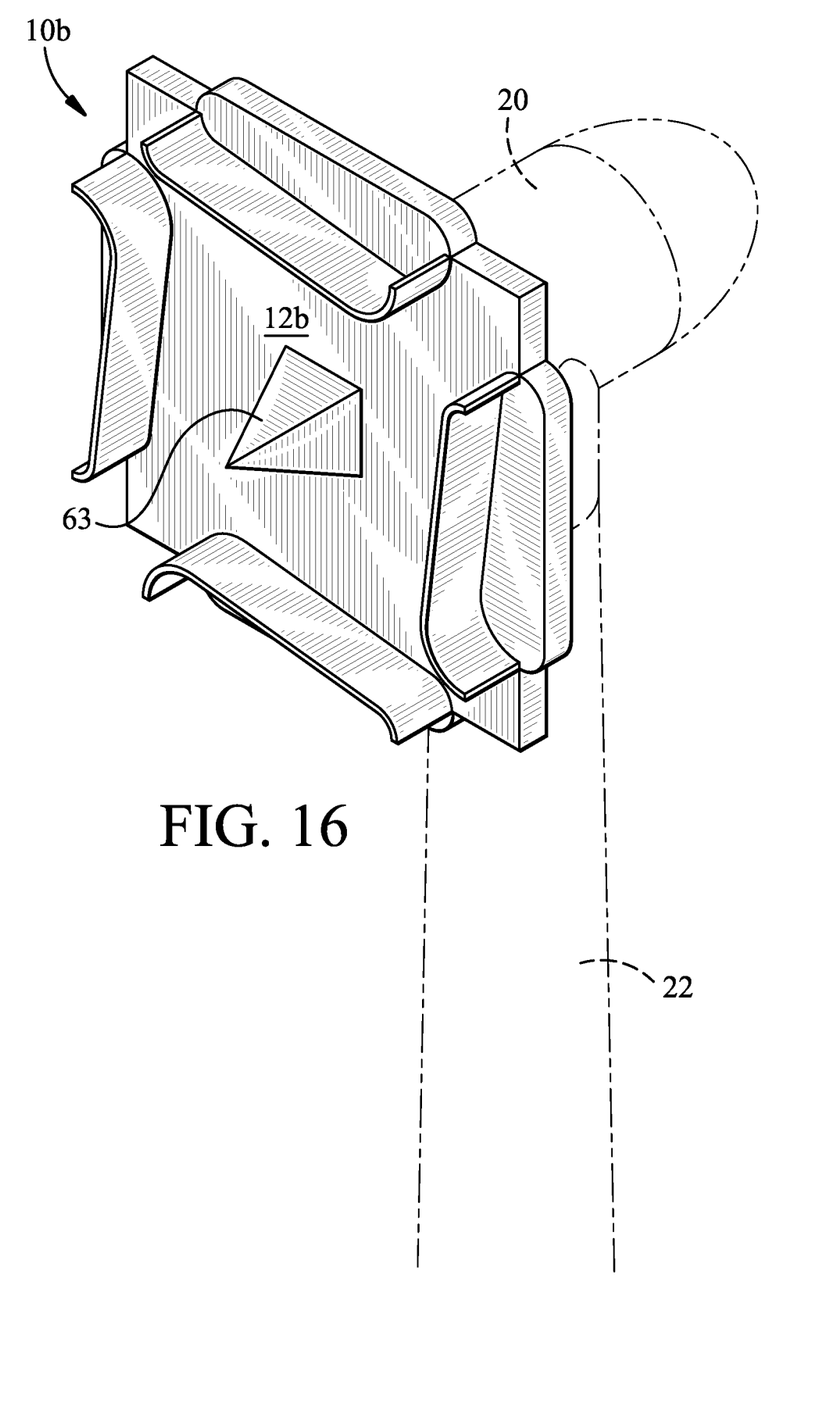
FIG. 16 is a perspective view of a further modified turbine rotor, constituting yet another embodiment of the invention.
Figure 17:
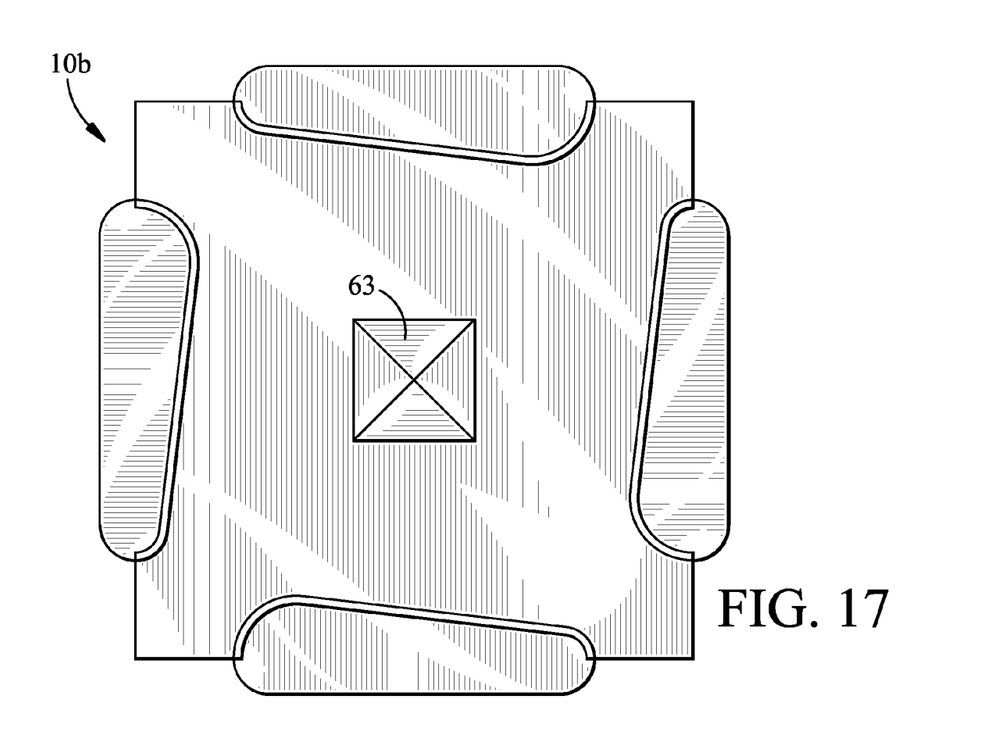
FIG. 17 is a front elevation of the rotor of FIG. 16.
Figure 18:
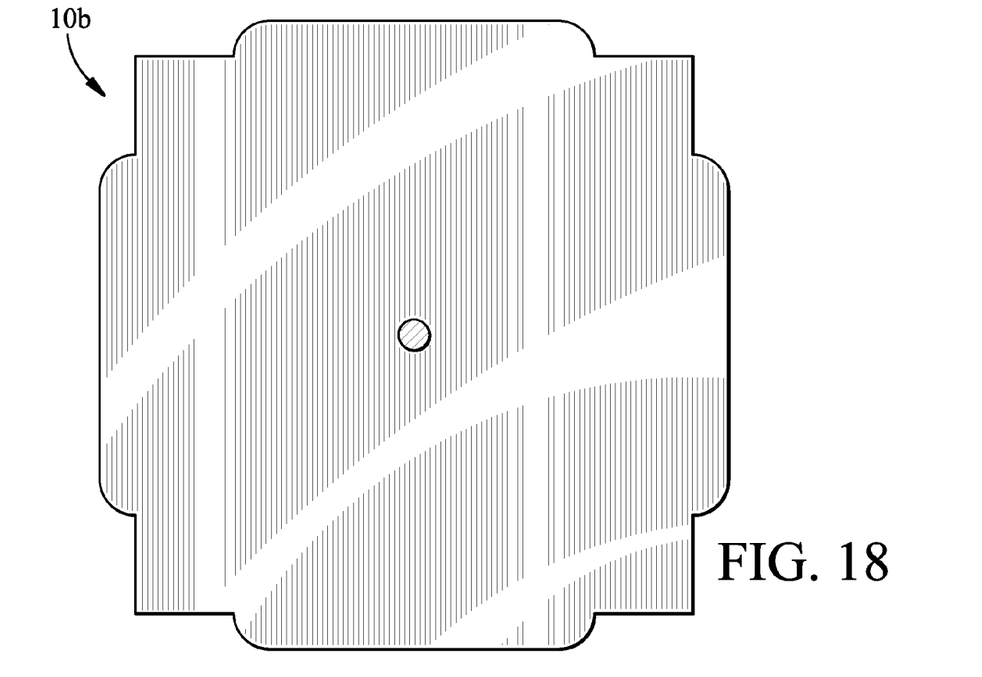
FIG. 18 is a rear elevation of the rotor of FIG. 16.
Figure 19:
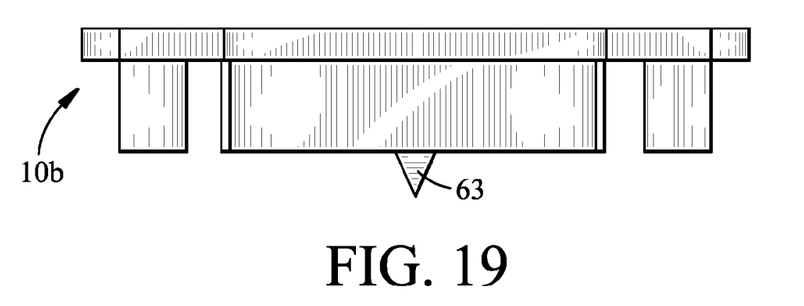
FIG. 19 is a top plan view of the rotor of FIG. 16.
Figure 20:
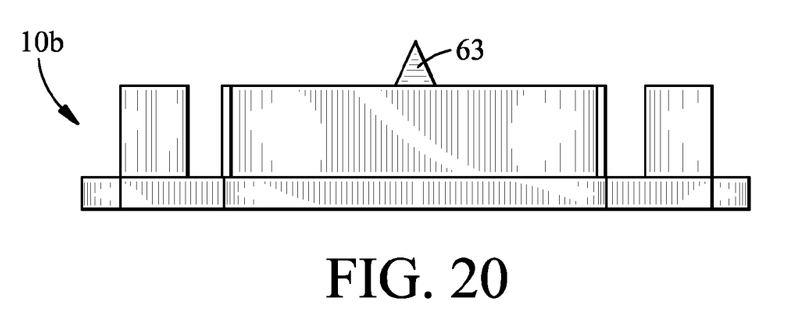
FIG. 20 is a bottom plan view of the rotor of FIG. 16.
Figure 21:
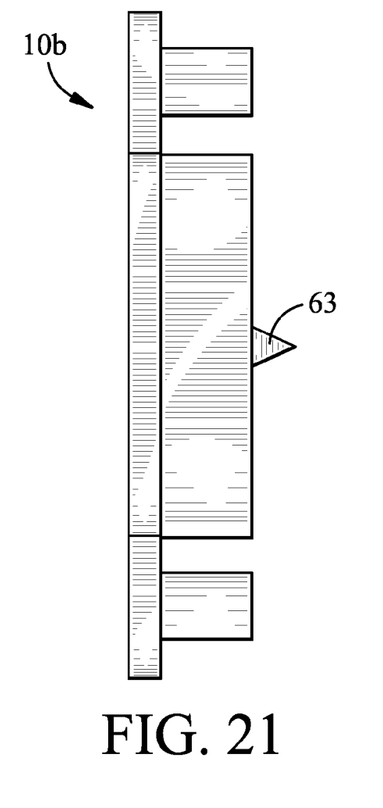
FIG. 21 is a left side elevation of the rotor of FIG. 16.
Figure 22:
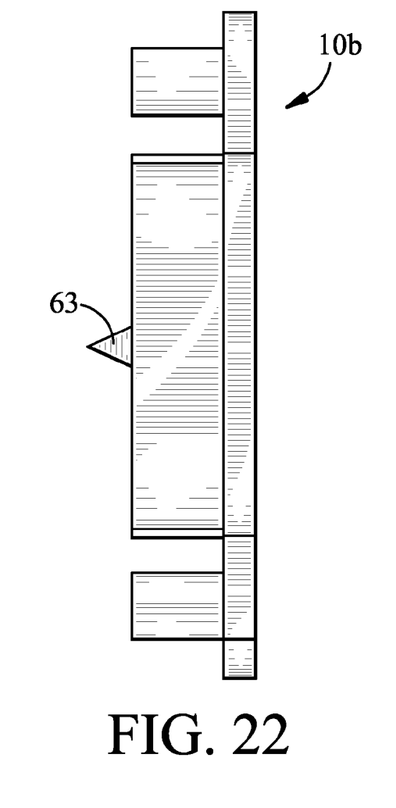
FIG. 22 is a right side elevation of the rotor of FIG. 16.

Another embodiment of the invention is illustrated in FIGS. 9-15, wherein a slightly modified construction is utilized, and wherein components corresponding to those of the first embodiment have been applied using the suffix "a". FIG. 9 shows the modifications, essentially concealing the drive shaft from the front of the expansive member 12a, and utilizing an upstanding conical projection 61 at the center of this member. In addition, the latter is enlarged with edge wings, that is, areas outside of the vanes 24a, 26a, 28a, and 30a, respectively. The vanes are similar to those of the first mentioned embodiments, and as presently understood, the wind currents generated by the central upstanding conical projection 61 are more forcefully re-directed radially outward by this structure, as can be understood.

Still another embodiment of the invention is shown in FIGS. 16-22, wherein the components similar to those of the second embodiment are similarly labelled, with the addition of the suffix, "b". As previously explained, the expansive member is enlarged by wings lying outside the vanes, and the central upstanding conical projection of FIG. 9 has been replaced by an upstanding pyramidal projection 63. As presently understood, the action of the pyramidal projection on the wind results in a rapid re-direction of the air flow, outwardly toward the vanes, as with the first embodiment. In other respects the structure of FIGS. 16-22, and resultant operation are believed to be similar to the corresponding structures set forth above in connection with the first two embodiments. One of ordinary skill will be able to understand these modifications from a study of the drawings and associated text.

Figure 23:
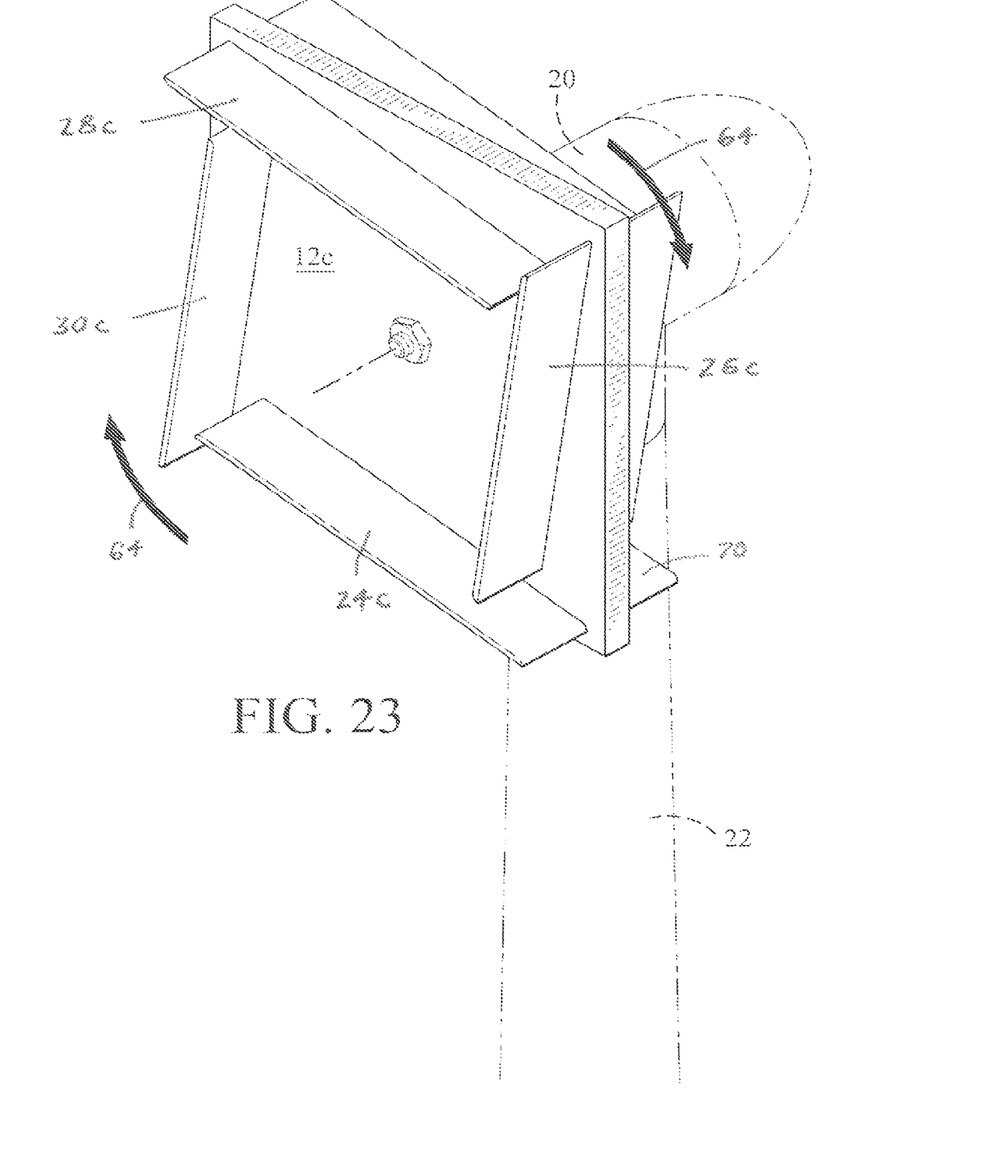
FIG. 23 is a perspective view of a further modified turbine rotor, constituting still another embodiment of the invention.
Figure 24:
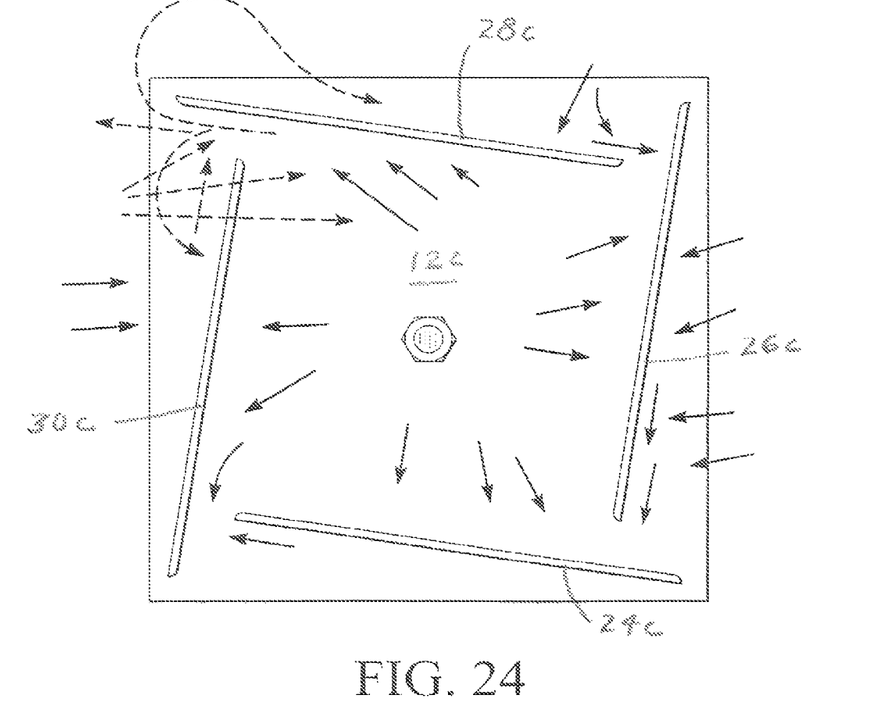
FIG. 24 is a front elevation of the rotor of FIG. 23.
Figure 25:
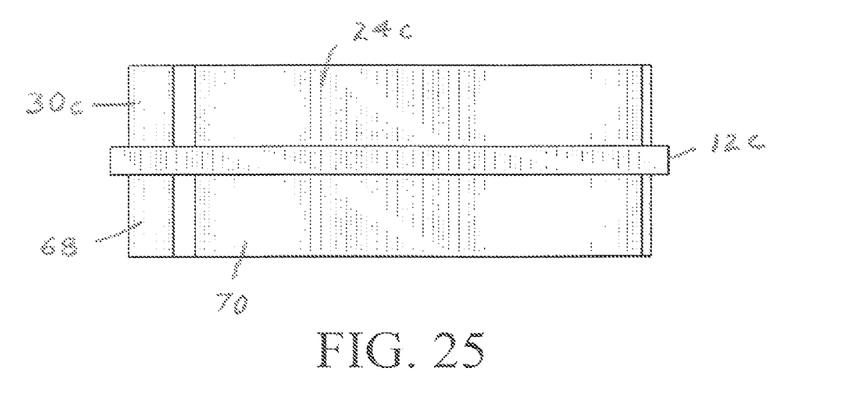
FIG. 25 is a bottom plan view of the rotor of FIG. 23.

Yet another embodiment of the invention is shown in FIGS. 23-25, wherein the components similar to those of the second embodiment are similarly labelled, with the addition of the suffix, "c". The structure of FIGS. 23-25, and resultant operation are believed to be similar to the corresponding structures set forth above in connection with the first three embodiments. However, it has been discovered that additional torque can be realized by re-forming the vanes 24c-30c to consist essentially of straight sections of material, without the curved ends that characterized the prior arrangements. The solid arrows 64 indicate the direction of rotation. Power generated by the wind is transferred to equipment 20 involved with electrical generating apparati, not shown in detail.

Specifically, the expansive member 12c is provided with straight, divergent vanes 24c, 26c, 28c, and 30c. In addition, the back face of the member 12c is also provided with vanes that correspond to vanes 24c-30c. Two of these corresponding vanes are shown in FIG. 25, namely those corresponding to Nos. 24c and 30c, and in FIG. 23, vanes 26c and 28c. The vanes on the back face are labelled 68 and 70, for purposes of explanation.

The small arrows in FIG. 24 are believed by the inventor, to represent the directions of the individual wind gusts that result from an front side wind gust impinging on face 12c. In other respects the operation of this embodiment are similar to that of the prior embodiments.

However, it appears to the instant applicant, that the use of straight vanes, as in FIG. 23, produces even higher torque than that available with the previous, curved vanes. Accordingly this embodiment is considered to be an especially valuable contribution to the surprisingly good operation of the rotors already discussed.

It is considered that the success of the invention lies in the combination of the expansive member broadside to the wind, coupled with the attached peripheral vanes having the straight portions and double curved ends which channel the wind flow. The resulting force on the skewed vanes produces, by the action/reaction phenomena, a powerful and highly efficient torque on the expansive member's support shaft, which is in turn coupled to the generating equipment.

From the above it can be seen that I have provided novel and improved, high-efficiency wind turbine structures which are simple in their makeup, and powerful in their application and use.

Each and every one of the appended claims defines an aspect of the invention which is separate and distinct from all others, and accordingly it is intended that they be considered as such when examined in the light of the prior art, in any determination of novelty or validity.

Variations and modifications are possible without departing from the spirit of the claims, and certain portions of the improvement can be used without others in accordance with the scope of the appended claims.

| List of reference numerals: | |
|---|---|
| 10 | Turbine rotor |
| 12 | Expansive member |
| 14 | Driven shaft |
| 18 | Axis of rotation |
| 20 | Equipment |
| 22 | Pole or support |
| 24 | Vane |
| 26 | Vane |
| 28 | Vane |
| 30 | Vane |
| 32 | Straight portion of vane |
| 34 | Straight portion of vane |
| 36 | Straight portion of vane |
| 38 | Straight portion of vane |
| 40, 42 | Curved end portion |
| 44, 46 | Curved end portion |
| 48, 50 | Curved end portion |
| 52, 53 | Curved end portion |
| 54 | Constriction |
| 56 | Constriction |
| 58 | Constriction |
| 60 | Constriction |
| 61 | Conical projection |
| 62 | Small arrows |
| 63 | Pyramid Projection |
| 64 | Larger solid arrows |
| 66 | Large hollow-outline arrows |

The embodiments of the invention in which an exclusive property or privilege is claimed are defined as follows:

1. A turbine rotor construction, comprising in combination:
   a) an expansive member having an axis of rotation,
   b) means at the axis, for mounting the member for rotation about said axis,
   c) a plurality of individual, thin upstanding vanes mounted rigidly on said expansive member and generally about the periphery of the member, each of said vanes having a substantially straight central portion and a pair of curved end portions, each of said central straight portions diverging outwardly along their respective lengths,
   d) at least one curved end portion of one vane being disposed near a curved end portion of at least one other adjacent vane, whereby wind impinging upon said expansive member is re-directed outwardly toward all of said vanes, and said vanes in turn re-directing said wind to spaces between each end portion of one vane and the end portion of an adjacent vane so as to be exhausted through the spaces between said end portions.

2. The turbine rotor construction as set forth in claim 1, wherein:
   a) the opposite end portions of each vane have a substantially arcuate shape which, together with an end portion of an adjacent vane, forms a plurality of constrictions that exhaust air from between the vanes.

3. The turbine rotor construction as set forth in claim 1, wherein:
   a) the expansive member and the vanes are constituted of a material selected from the group consisting of aluminum, steel alloy, and carbon fiber.

4. The turbine rotor construction as set forth in claim 1, wherein:
   a) the number of vanes is four, and said vanes are disposed uniformly about the periphery of the expansive member.

5. The turbine rotor construction as set forth in claim 2, wherein:
   a) the arcuate end portions of each vane have different curvatures.

6. The turbine rotor construction as set forth in claim 2, wherein:
   a) the arcuate'end portion of one vane has a convex outer surface that faces a corresponding convex outer surface of an adjacent vane.

7. The turbine rotor construction as set forth in claim 2, wherein:
   a) the arcuate end portions of a given vane both have concave surfaces facing one another.

8. The turbine rotor construction as set forth in claim 1, wherein:
   a) all vanes are substantially identical to one another.

9. The turbine rotor construction as set forth in claim 1, wherein:
   a) the vanes are disposed in parallel-oriented relation, the vanes of one pair being disposed on opposite sides of the axis of rotation, and the vanes of a second pair being similarly disposed on opposite sides of the axis of rotation.

\* \* \* \* \*